(12) United States Patent
Smith

(10) Patent No.: US 10,681,137 B2
(45) Date of Patent: Jun. 9, 2020

(54) SYSTEM AND METHOD FOR NETWORK-ATTACHED STORAGE DEVICES

(71) Applicant: Samsung Electronics Co., Ltd., Suwon-si, Gyeonggi-do (KR)

(72) Inventor: Hubbert Smith, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/905,716

(22) Filed: Feb. 26, 2018

(65) Prior Publication Data

US 2019/0199796 A1    Jun. 27, 2019

Related U.S. Application Data

(60) Provisional application No. 62/610,036, filed on Dec. 22, 2017, provisional application No. 62/609,948, filed on Dec. 22, 2017.

(51) Int. Cl.
*H04L 29/08* (2006.01)
*H04L 29/06* (2006.01)

(52) U.S. Cl.
CPC ........ *H04L 67/1097* (2013.01); *H04L 63/101* (2013.01); *H04L 65/1063* (2013.01); *H04L 67/26* (2013.01); *H04L 67/2842* (2013.01)

(58) Field of Classification Search
CPC . H04L 67/1097; H04L 67/26; H04L 67/2842; H04L 65/1063
USPC ........................................................ 709/219
See application file for complete search history.

(56) References Cited

U.S. PATENT DOCUMENTS 5,964,835 A * 10/1999 Fowler ............. G01R 31/31727
                                                     709/216
7,280,536 B2    10/2007 Testardi
7,624,109 B2    11/2009 Testardi
9,069,790 B2     6/2015 Lord
(Continued)

FOREIGN PATENT DOCUMENTS

| JP | 2016-046785 | 4/2016 |
| KR | 10-1402923 | 6/2014 |
| KR | 10-2015-0123678 | 11/2015 |

OTHER PUBLICATIONS

U.S. Office Action dated Nov. 21, 2019, issued in U.S. Appl. No. 15/921,568, (28 pages).
(Continued)

*Primary Examiner* — Tauqir Hussain
(74) *Attorney, Agent, or Firm* — Lewis Roca Rothgerber Christie LLP

(57) ABSTRACT

A system and method for a network-attached storage system includes at least one network-attached storage device, an application server, and a control server. In various embodiments, the control server is configured to discover the at least one network-attached storage device and configure a storage volume and a storage pool having the at least one network-attached storage device. The control server may claim each of the at least one network-attached storage device by sending each network-attached storage device a device whitelist. The control server is also configured to map the application server to the storage volume and provide the application server with an application server whitelist.

18 Claims, 8 Drawing Sheets

(56) References Cited

U.S. PATENT DOCUMENTS

| | | | |
|---|---|---|---|
| 9,088,457 B1 | 7/2015 | Johnson | |
| 9,326,261 B2 | 4/2016 | Wei | |
| 9,772,866 B1 | 9/2017 | Aron et al. | |
| 2002/0053029 A1* | 5/2002 | Nakamura | G06Q 20/20 726/13 |
| 2002/0161767 A1 | 10/2002 | Shapiro et al. | |
| 2003/0023738 A1 | 1/2003 | Boivie et al. | |
| 2010/0312809 A1 | 12/2010 | Calder et al. | |
| 2011/0302320 A1 | 12/2011 | Dunstan et al. | |
| 2012/0124092 A1 | 5/2012 | Teranishi et al. | |
| 2013/0132544 A1 | 5/2013 | Krishnan et al. | |
| 2013/0198636 A1 | 8/2013 | Kief et al. | |
| 2013/0262392 A1* | 10/2013 | Vibhor | H04M 1/72563 707/654 |
| 2014/0164547 A1 | 6/2014 | Fullagar et al. | |
| 2015/0058441 A1 | 2/2015 | Weizman et al. | |
| 2016/0154403 A1 | 6/2016 | Arbogast | |
| 2016/0285882 A1 | 9/2016 | Brunn et al. | |
| 2016/0294971 A1 | 10/2016 | Li et al. | |
| 2016/0306579 A1* | 10/2016 | Lee | G06F 3/0625 |
| 2017/0147158 A1 | 5/2017 | Mukhopadhyay et al. | |
| 2019/0028743 A1 | 1/2019 | He et al. | |
| 2019/0141128 A1 | 5/2019 | Hallak et al. | |

OTHER PUBLICATIONS

Notice of Allowance issued in U.S. Appl. No. 15/921,568 by the USPTO, dated Mar. 18, 2020, 20 pages.

* cited by examiner

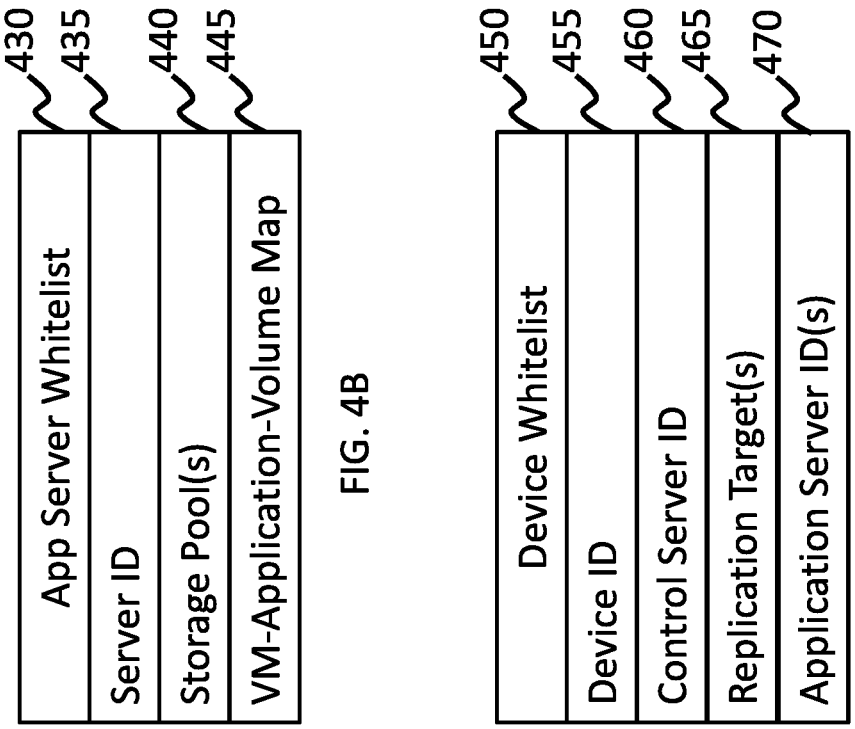
FIG. 4B
FIG. 4C
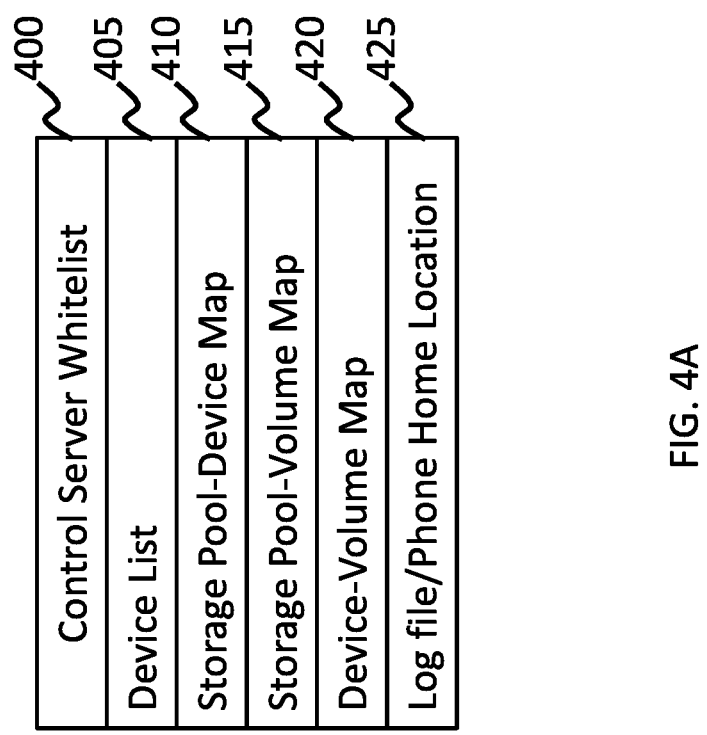
FIG. 4A

SYSTEM AND METHOD FOR NETWORK-ATTACHED STORAGE DEVICES

CROSS-REFERENCE TO RELATED APPLICATION(S)

The present application claims priority to and the benefit of U.S. Provisional Patent Application No. 62/610,036, filed on Dec. 22, 2017 and of U.S. Provisional Patent Application No. 62/609,948, filed on Dec. 22, 2017, the entire contents of both of which are incorporated herein by reference.

BACKGROUND

1. Field

Some embodiments of the present disclosure relate generally to the provisioning and use of a network-attached storage device.

2. Description of the Related Art

Network-attached storage (NAS) systems are utilized for a variety of data storage applications. In some applications a NAS system may provide data storage to a number of remote applications. For example a NAS system may operate as a storage system for a database, an email system, a storage backup, and many other data applications. In many cases, the NAS system needs have data protection in place to ensure that data integrity is maintained (e.g. data for a first application is not incorrectly overwritten with data from a second application).

Ethernet solid state drives (eSSDs) have presented new issues with maintaining data protection. ESSDs allow for applications operating on remote servers to directly access data via a network connection (e.g. have a separate data path). For example, Non-volatile memory express over fabrics (NVMe-Of) allows for a host computer to perform Input/Output (I/O) operations directly with a SSD via a network. Using eSSDs allows for remote direct attached storage that is disaggregated with a relatively minimal latency addition.

ESSDs, unlike traditional storage have a separate communications path for control operations and data operations. For example, for a regular SSD, a remote application sends an I/O request to a storage server having directly attached SSDs (or HDDs). Thus, the storage server is able to directly execute the I/O on the SSD. An eSSD system may be disaggregated and the application may have to first communicate with the control server, which then communicates to the eSSD to allow I/O to be initiated between the eSSD and the application. The separate verification causes a performance bottleneck, as well as offering less reliability and an increased security risk.

RAID cards, NAS, and Storage Area Networks (SANs) are all capable of performing replicated data writes that do not separate the control path and data path. As such, these traditional systems do not have the above described drawbacks of eSSDs. Similarly, Hyperscale 2-phase commits (e.g. atomic operations) also include an integrated control and data path. Thus, a system that utilizes eSSDs without the limitations of a separate control path is desired.

The above information is only for enhancement of understanding of the background of embodiments of the present disclosure, and therefore may contain information that does not form the prior art.

SUMMARY

Some embodiments of the present disclosure provide a system and method for network-attached storage devices. In various embodiments, a network-attached storage system may include at least one network-attached storage device, at least one application server, and a control server. The control server may include a memory and a processor, configured to execute instructions from the memory that, when executed by the processor, causes the processor to initialize the system. In various embodiments, the control server may discover the at least one network-attached storage device, configure a storage volume and a storage pool having the at least one network-attached storage device, claim each of the at least one network-attached storage device by sending each of the at least one network-attached storage device a device whitelist, map the application server to the storage volume, and provide the application server with an application server whitelist.

In various embodiments, the at least one network-attached storage device may be an Ethernet solid state drive (eSSD).

In various embodiments, the control server generates a control server whitelist having a network-attached storage device list, a storage pool to network-attached storage device map, a storage pool to storage volume map, a network-attached storage device to storage volume map, and a log file.

In various embodiments, the application server whitelist includes at least one available storage pool and an application to volume map.

In various embodiments, the device whitelist includes a control server identifier, at least one replication target, and at least one application server identifier having access rights to the at least one network-attached storage device.

In various embodiments, the application server is configured to send an Input/Output (I/O) request directly to the at least one network-attached storage device according to the application server whitelist.

In various embodiments, the at least one network-attached storage device verifies, using the device whitelist, that the application server has authority for executing the I/O request.

In various embodiments, the application server may send the Input/Output (I/O) request directly to a tertiary device in the storage pool when the I/O request fails.

In various embodiments, the I/O request may be an atomic write or an atomic read.

BRIEF DESCRIPTION OF THE DRAWINGS

Some embodiments can be understood in more detail from the following description taken in conjunction with the accompanying drawings, in which:

FIGS. 4A-C depict whitelists according to various embodiments of the present invention;

DETAILED DESCRIPTION

Figure 1:
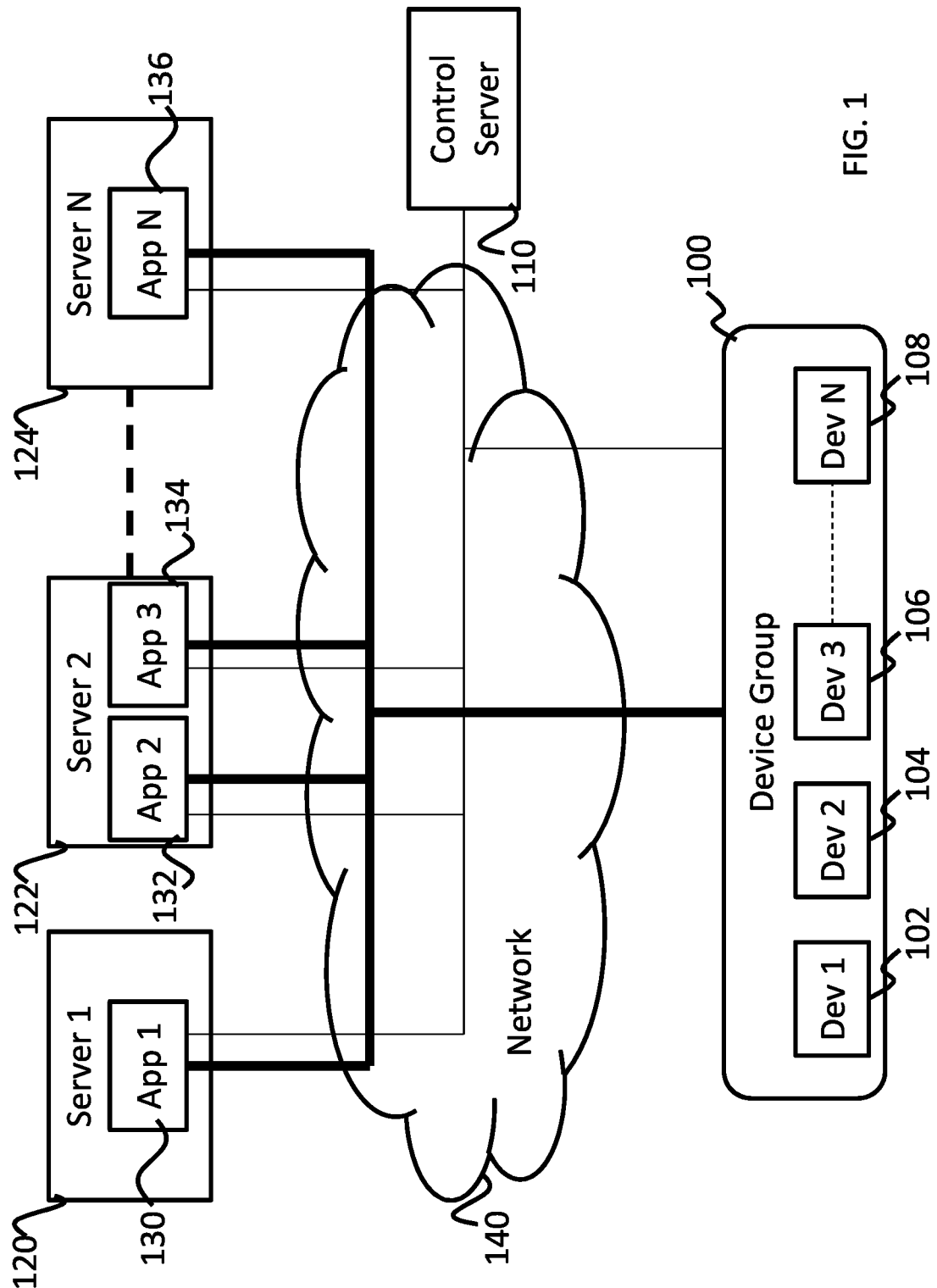
FIG. 1 depicts a network-attached storage system in accordance with various embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a system and method for networked attached storage. In various embodiments, the system includes an eSSD system having a control server that manages and a plurality of attached devices (e.g. eSSDs) via a control plane. In various embodiments, during an initialization stage, the control server communicates with the devices using an independent control plane without involving a data plane. The devices then communicate with application servers using an independent data plane without any further involvement from the control plane. In various embodiments, at the initialization stage, the control server may identify each connected eSSD, provision each of the attached devices into storage pools and volumes, and provide the devices with a whitelist having identifiers for applications that have access writes to the storage pools and volumes. In various embodiments, the system is configured to utilize the whitelist to allow for the devices to independently operate without the intervention from the control server. For example, in various embodiments, the system may be configured to allow for atomic writes, reads, and for read/write error handling.

FIG. 1 depicts a network-attached storage system in accordance with various embodiments of the present invention.

Referring, to FIG. 1, in various embodiments, a network-attached storage system includes at least one device group 100 made up of a plurality of storage devices 102-108. In various embodiments, the storage devices 102-108 include network connected storage devices such as a hard drive, an eSSD, an NVMe-OF device, or any other network-attached block device. In various embodiments, the network connected storage devices 102-108 include a network connection, a storage controller (e.g. a SSD controller), a firmware, and primary storage (e.g. flash).

In various embodiments, a control server 110 is configured to enable communications between the device group 100 and one or more application servers 120-124. In various embodiments, the control server 110 may communicate with the servers 120-124 and the device group 120 the network 140. In other embodiments, the control server 110 may communicate to the device group 100 using a data bus, such as a PCEe bus used for data replication from one PCI storage card to another PCI storage card in the same server, or for data replication from a PCI storage card to another PCI storage card in a remote server, or for data replication from a PCI storage card to a remote eSSD.

In various embodiments, the application servers 120-124 may have one or more applications 130-136 operating on them. For example, the applications 130-136 operating on the application servers 120-124 may perform Input/Output (I/O) operations on the devices via the network 160.

Figure 2:
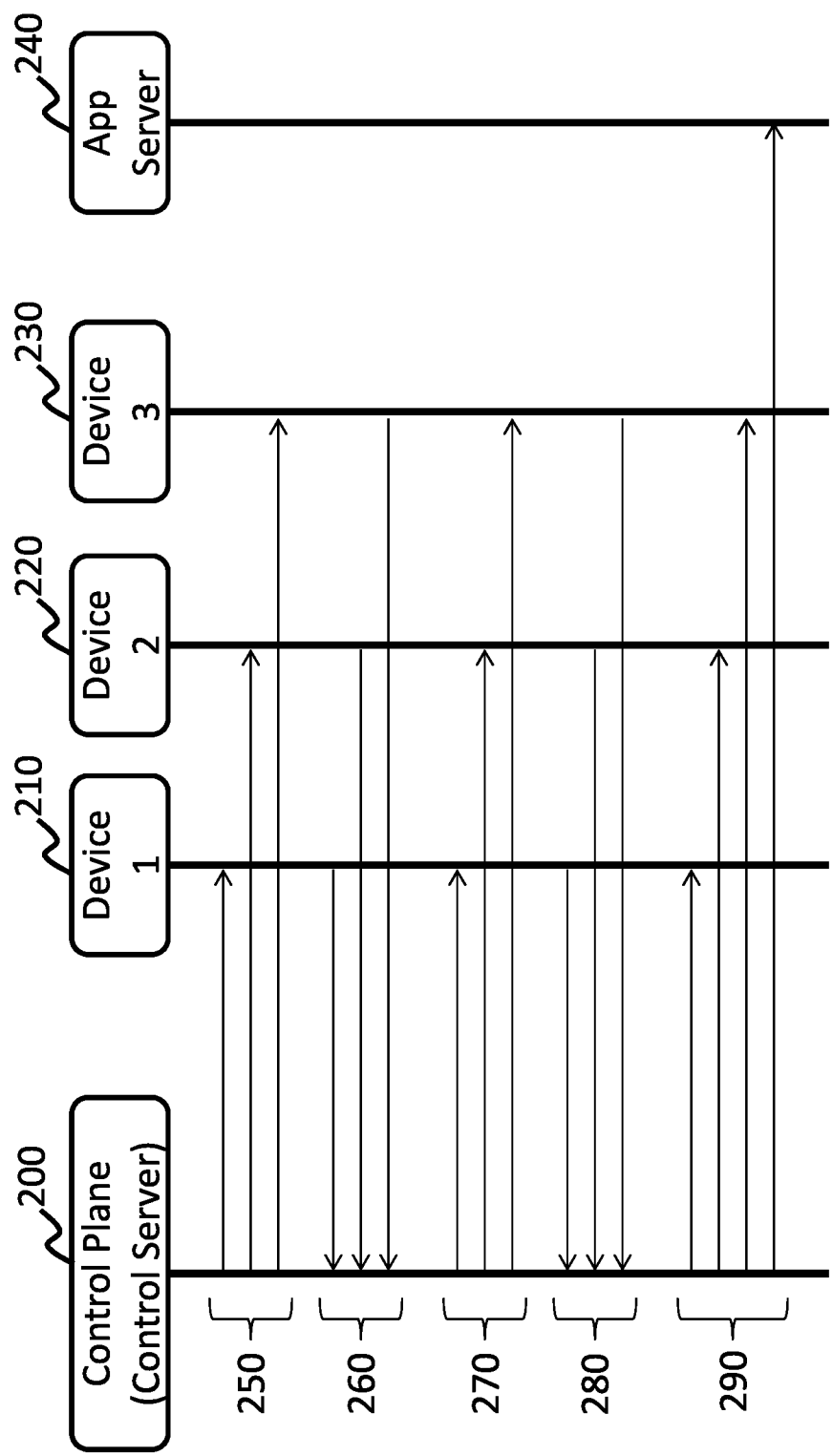
FIG. 2 is a communications chart depicting the communication during initialization according to various embodiments.
Figure 3:
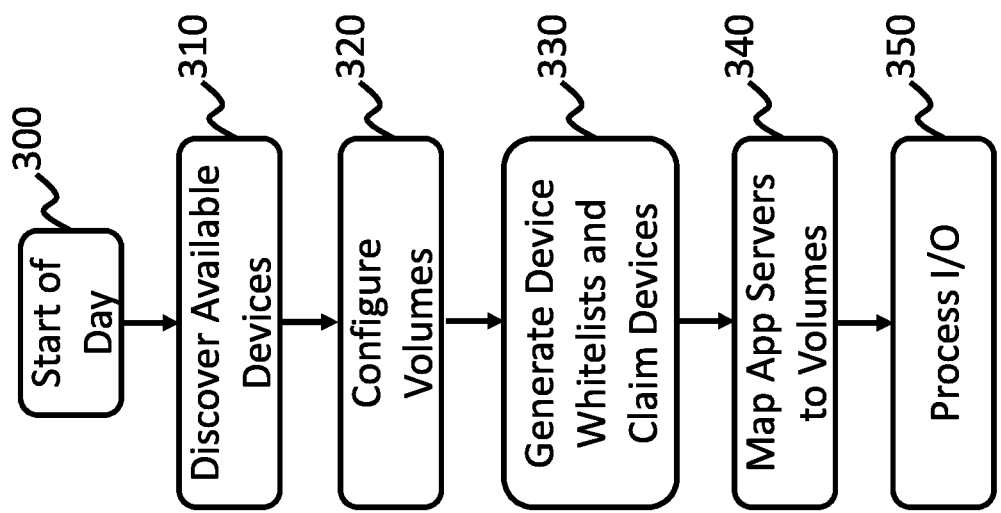
FIG. 3 depicts a method for system initialization according to various embodiments of the present invention.

FIG. 2 is a communications chart depicting the communication during initialization according to various embodiments. FIG. 3 depicts a method for system initialization according to various embodiments of the present invention.

Referring to FIGS. 2 and 3, in various embodiments the control server 200 is configured to discover and assign the attached devices 210, 220, 230 to each attached application server 240. In various embodiments, the system initialization begins at a "Start of Day" (e.g. when new hardware has been installed, or the system has been reconfigured) (S300). In various embodiments, the system is configured to discover available network-attached devices 210-230 (S310). For example, in various embodiments, the control server 200 may signal each network-attached device (210-230) with a discovery signal (250). For example, the control plane may ping (e.g. send a data packet and wait for a response packet) each IP address in an IP range for a device group (e.g. devices 210-230). Each of the attached and available (e.g. unassigned) devices 210-230 may then send a response signal (260) (e.g. a ping response packet). In various embodiments, the attached and available devices 210-230 may be configured into one or more volumes (S320). For example, in various embodiments, a system administrator may select one or more devices from the available devices 210-230 as part of a volume. The control server 200 may then generate a whitelist for each of the devices and claim each of the devices 210-230 by sending the devices the whitelists (270) (S330). In various embodiments, the whitelists may include volume configuration and replication information. In various embodiments, the devices 210-230 may store their respective whitelists in their firmware. Upon receiving the whitelist from the control server 200, the devices 210-230 become "owned" by the control server 200 and will signal to the control server 200 their change in status (280). For example, once the devices 210-230 become owned by a control server 200, they will only allow for whitelist updates to come from the control server 200. In various embodiments, the control server 200 may then map application servers 240 to the one or more volumes (e.g. storage pools, device mirroring, etc.) and send an application server whitelist (290) indicating the accessible volumes to the application server 240 and also an updated whitelist to the volumes being assigned to the application server 240 (S340). In various embodiments, the devices 210-230 may operate (e.g. process I/O operations) according to their device whitelist (S350). For example, the device 210 may receive an I/O request from the application server 240. The I/O request may include an identifier for the application server 240. The device 210, upon receiving the request, may utilize the identifier to verify that the application server 240 has access rights to the device 210.

FIGS. 4A-C depict whitelists according to various embodiments of the present invention.

Referring to FIGS. 4A-4C, in various embodiments, a control server whitelist 400, an app server whitelist 430, and a device whitelist 450 may be generated during the initialization period (e.g. start of day) described above. In various embodiments, the control whitelist 400 may be stored on the control server configured to manage network connected devices (e.g. eSSDs), the application server whitelist 430 may be stored in persistent memory on the application server, and the device whitelist may be stored in a firmware on each network storage device. In various embodiments, the control whitelist 400 includes a device list 405. The device list 405 may include a listing of each device that is controlled (e.g. owned) by the controller. In various embodiments, the control whitelist 400 includes a storage pool to device map 410, a storage pool to volume map 415, a device to volume map 420. In various embodiments, the control whitelist 400 may also include a log file 425 (e.g. a phone home location).

In various embodiments, the application server whitelist 430 may be stored on each application server utilizing the devices for storage. In some embodiments, each application server may include one or more virtual machines and each virtual machine may include its own application server whitelist 430. In other embodiments, an application server may include as single application server whitelist 430. In various embodiments, the application server whitelist includes a server identification 435 (e.g. a physical server ID such as a MAC address), a storage pool list 440 (e.g. a list of available storage pools that each application/virtual machine may access), and a virtual machine/application volume map 445 (e.g. volumes are accessible for which applications). In various embodiments, each device in the system may include a device whitelist 450. In various embodiments, the device whitelist 450 may be stored in a nonvolatile memory on each device (e.g. in the device firmware). In various embodiments, the device whitelist 450 may include a device identification 455 (e.g. a physical identification such as a MAC address), a console identification 460 that identifies the controlling console, a list of replication targets 465, and a list of one or more application server identifiers 470 (e.g. a list of server IDs 435).

Figure 5:
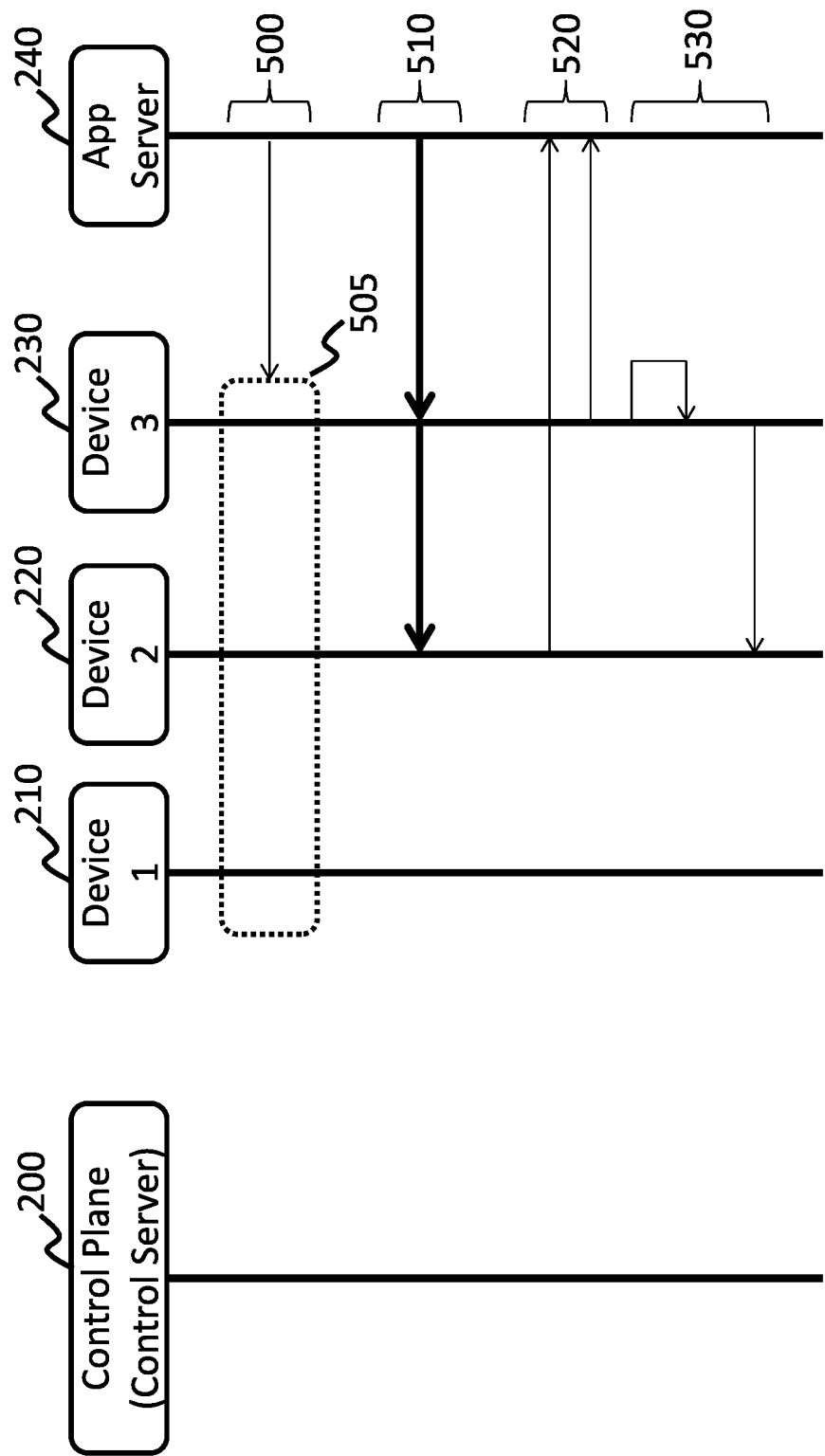
FIG. 5 is a chart depicting the process of performing a successful atomic write in accordance with various embodiments of the present invention.

FIG. 5 is a chart depicting the process of performing a successful atomic write in accordance with various embodiments of the present invention.

Referring to FIG. 5 and with continued reference to FIGS. 4A-C, in various embodiments, an application server 240 may be configured to perform I/O via a network connected to each of the devices 210-230 without any intervention from the control server 200. For example, in various embodiments, the application server 240 may attempt an atomic write to a volume 505. In various embodiments, the application server 240 may check the application server whitelist's application-volume map 445 to determine which volume it will be writing to for the application requesting I/O. The application server 240 then sends the atomic write request (500) to the volume 505. Upon receiving the atomic write request, the device 210-230 (e.g. the primary device for the volume) utilizes its storage controller to verify that the application server 240 has authority to write to the volume/device by checking the by comparing the application server's server ID 435 with the application server ID(s) 470 on the device whitelist 450. The application server 240 may then write to the volume 505 (510). For example, in various embodiments, device 3 230 may be the primary device in the volume 505 and device 2 220 may be the secondary device. Device 3 230 may journal the write and then device 2 220 may then journal the write. After the write has been complete, device 2 220 and device 3 230 may signal the application server 240 that the write is complete (520). In various embodiments, device 3 230 and device 2 220 may then flush the journal entry to primary storage.

Figure 6:
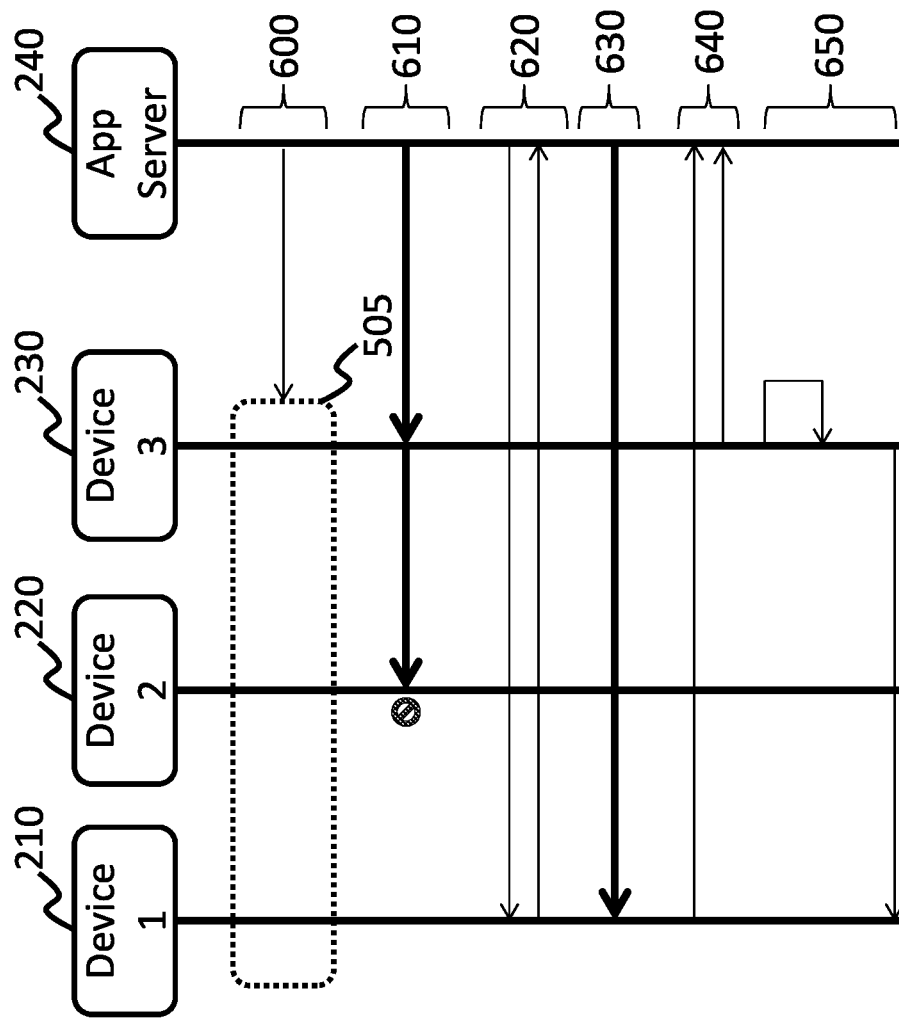
FIG. 6 is a chart depicting the process of performing an unsuccessful atomic write in accordance with various embodiments of the present invention.

FIG. 6 is a chart depicting the process of performing an unsuccessful atomic write in accordance with various embodiments of the present invention.

Referring to FIG. 6, in various embodiments, an application server 240 may be configured to perform atomic writes via a network connected to each of the devices 210-230 without any intervention from the control server 200 even when a write attempt fails. As described above, the system is configured to utilize the application server whitelists 430 and the device whitelist 450 to verify that the application server 240 is authorized to write to the volume 505. In various embodiments, the application server sends a write request to the volume 505 according to the application-volume map 445 (600). In some instances, one of the devices (e.g. device 2 220) may not respond or throw an error when the application server attempts to write data to the device (610). In various embodiments, the application server may check the next device on the application-volume map 445. In the depicted example, the application server sends a request to device 1 210 and device 1 responds if it is available (620). The application server 240 may the retry writing to the new device (e.g. a tertiary device for the volume, such as device 1 210) (630). After the write has been completed, the devices 230/210 may report that the write was complete (640). The devices then flush the journal entry to primary storage, first at the primary device 230 followed by at the tertiary device 210 (650).

Figure 7:
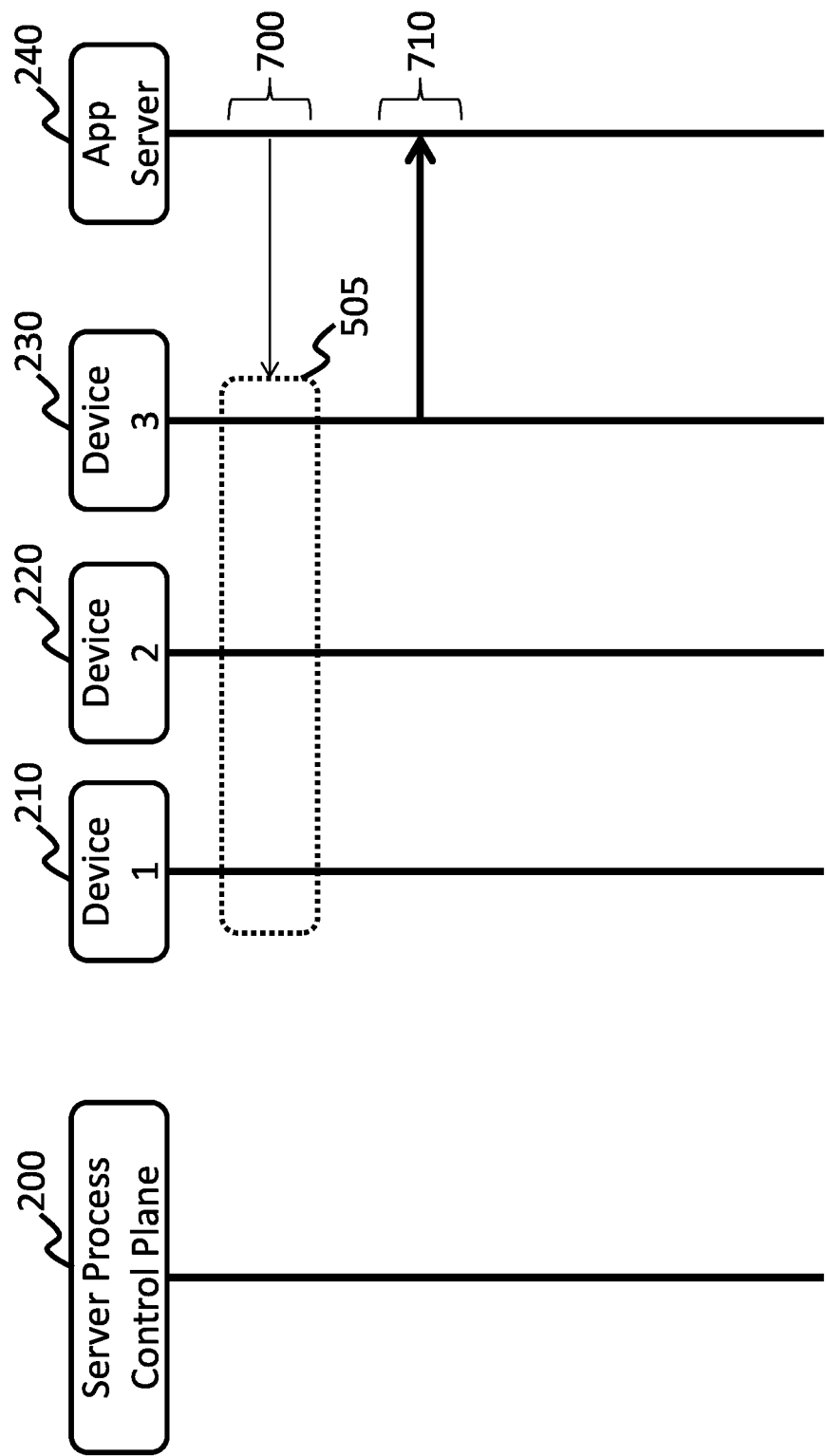
FIG. 7 is a chart depicting the process of performing an atomic read in accordance with various embodiments of the present invention.

FIG. 7 is a chart depicting the process of performing an atomic read in accordance with various embodiments of the present invention.

Referring to FIG. 7, in various embodiments, an application server 240 may be configured to perform reads via a network connected to each of the devices 210-230 without any intervention from the control server 200. For example, the application server 240 may utilize the application-volume map 445 from the application server whitelist 430 to direct a read request to the appropriate devices of the volume 505 (700). Again, the devices may, independent from the control server 200, utilize the devices' storage controllers and whitelists to verify that the application server has access rights to the stored data. The appropriate device from the volume 505 (e.g. the closest device) responds to the read request (710). In some embodiments, a secondary device (e.g. device 2 220) may pre-fetch the data in case the primary device (e.g. device 3 230) encounters an error or failure.

Figure 8:
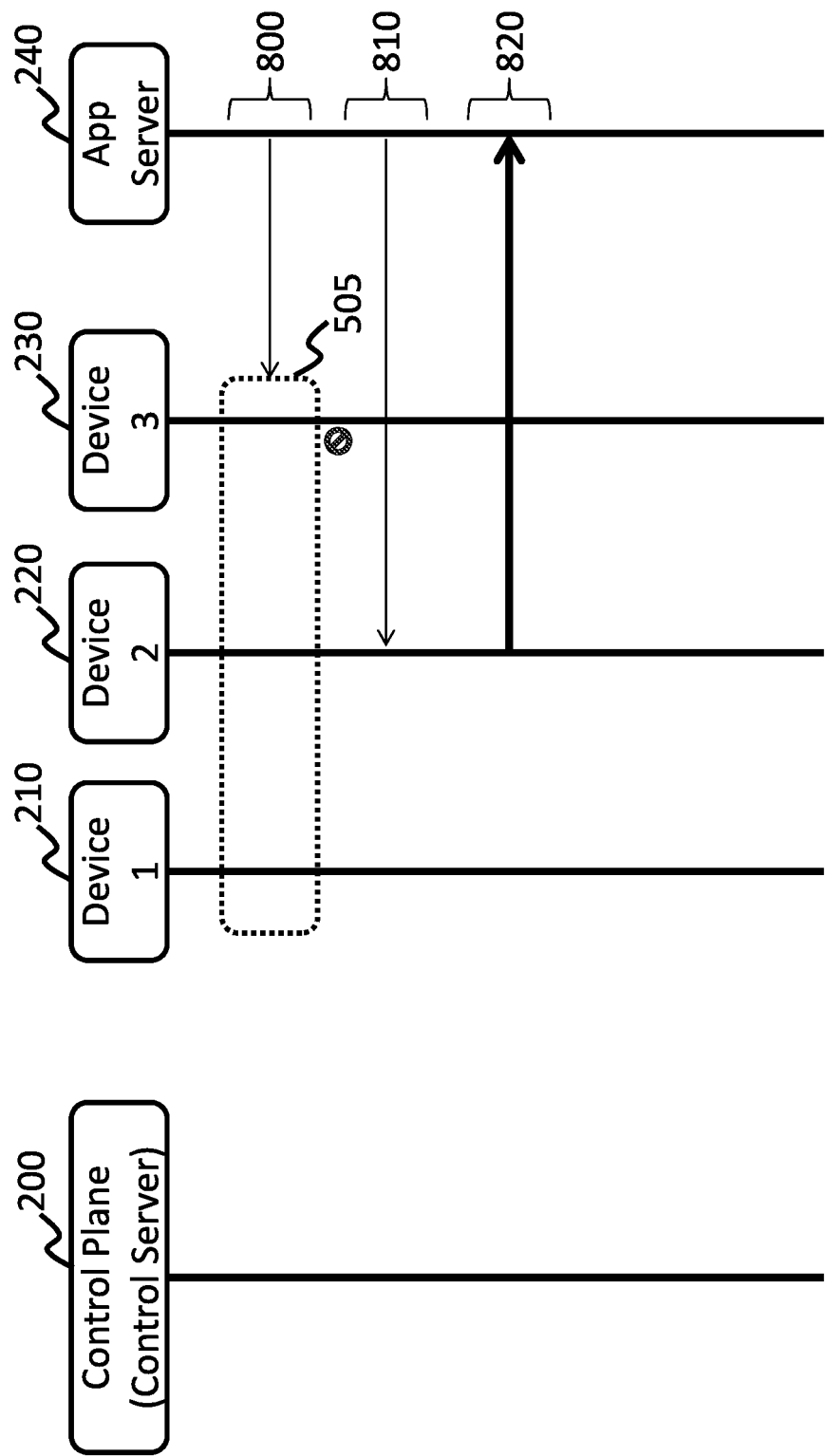
FIG. 8 is a chart depicting the process of performing an atomic read when a device failure occurs in accordance with various embodiments of the present invention.

FIG. 8 is a chart depicting the process of performing an atomic read when a device failure occurs in accordance with various embodiments of the present invention.

Referring to FIG. 8, in various embodiments, an application server 240 may be configured to perform reads via a network connected to each of the devices 210-230 without any intervention from the control server 200 when a device error occurs. For example, as described above, the application server 240 directs a read request to the appropriate device of the volume 505 (800). For example, the storage map may direct the I/O to device 3 230 and device 2 220 and the request to device 3 fails (i.e. device 3 230 does not respond). In various embodiments, the application server 240 may then retry the read request on the next device in the volume (device 2 220) (810). Device 2 220 may then send the data to the application server 240 (820).

Accordingly, the above described embodiments of the present disclosure provide a system and method for network-attached storage devices. In various embodiments, the system utilizes one or more whitelists to allow for direct communication between network-attached storage and remote application servers without intervention from a control plane. Accordingly, the system reduces the security issues and performance bottlenecks associated with sending I/O requests to a control server. For example, only one control server may be capable of discovering the eSSDs and the system is configured such that the control server is the only device which can change the configuration and access of the eSSDs. The eSSDs are not vulnerable to typical attacks which exploit operating systems and executables. Additionally, the control server may be taken off-line to eliminate the control server as a possible attack point.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A network-attached storage system comprising:
   at least one network-attached storage device;
   an application server; and
   a control server, the control server comprising:
     a memory; and
     a processor, wherein the processor executes instructions from the memory that, when executed by the processor, causes the processor to:
       discover the at least one network-attached storage device;
       configure a storage volume and a storage pool having the at least one network-attached storage device;
       assign the at least one network-attached storage device by sending each of the at least one network-attached storage device a device whitelist;
       generate a map between the application server and the storage volume; and
       provide the application server with an application server whitelist, wherein the application server is configured to send an input/output (I/O) request directly to the at least one network-attached storage device via a network according to the application server whitelist.

2. The network-attached storage system of claim 1, wherein the at least one network-attached storage device comprise an Ethernet solid state drive (eSSD).

3. The network-attached storage system of claim 1, wherein the instructions further cause the processor to:
   generate a control server whitelist, the control server whitelist comprising:
     a network-attached storage device list;
     a storage pool to network-attached storage device map;
     a storage pool to storage volume map;
     a network-attached storage device to storage volume map; and
     a log file.

4. The network-attached storage system of claim 1, wherein the application server whitelist further comprises:
   at least one available storage pool; and
   an application to volume map.

5. The network-attached storage system of claim 1, wherein the device whitelist comprises:
   a control server identifier;
   at least one replication target; and
   at least one application server identifier having access rights to the at least one network-attached storage device.

6. The network-attached storage system of claim 1, wherein the at least one network-attached storage device verifies, using the device whitelist, that the application server has authority for executing the I/O request.

7. The network-attached storage system of claim 6, wherein the application server is further configured to:
   determine that the I/O request fails; and
   send the I/O request directly to a tertiary device.

8. The network-attached storage system of claim 1, wherein the I/O request comprises one of an atomic write or an atomic read.

9. A method of operating a network-attached storage system comprising:
   discovering, by a control server, at least one network-attached storage device;
   configuring, by the control server, a storage volume and a storage pool having the at least one network-attached storage device;
   claiming, by the control server, each of the at least one network-attached storage device by sending each of the at least one network-attached storage device a device whitelist;
   generating, by the control server, a mapping between an application server and the storage volume; and
   providing, by the control server, the application server with an application server whitelist,
   wherein the application server is configured to send an input/output (I/O) request directly to the at least one network-attached storage device via a network according to the application server whitelist.

10. The method of claim 9, further comprising:
    generating, by the control server, a control server whitelist, the control server whitelist comprising:
      a network-attached storage device list;
      a storage pool to network-attached storage device map;
      a storage pool to storage volume map;
      a network-attached storage device to storage volume map; and
      a log file.

11. The method of claim 9, wherein the application server whitelist further comprises:
    at least one available storage pool; and
    an application to volume map.

12. The method of claim 9, wherein the device whitelist comprises:
    a control server identifier;
    at least one replication target; and
    at least one application server identifier having access rights to the at least one network-attached storage device.

13. The method of claim 9, wherein the at least one network-attached storage device is configured to verify, using the device whitelist, that the application server has authority for executing the I/O request.

14. The method of claim 13, wherein the application server is further configured to:
   determine that the I/O request fails; and
   send the I/O request directly to a tertiary device in the storage pool.

15. The method of claim 9, wherein the I/O request comprises one of an atomic write or an atomic read.

16. A network-attached storage device comprising:
   a network connection attached to a network;
   a primary memory;
   a firmware, storing a device whitelist; and
   a storage controller, the storage controller configured to:
      receive an input/output (I/O) requests directly from an application server via the network; and
      determine whether the application server is authorized to execute the I/O request using the device whitelist; and
      execute the I/O request using the primary memory when the application server is authorized.

17. The network-attached storage device of claim 16, wherein the I/O request comprises one of an atomic write or an atomic read.

18. The network-attached storage device of claim 17, wherein the device whitelist comprises:
   a control server identifier;
   at least one replication target; and
   at least one application server identifier having access rights to the network-attached storage device.

* * * * *